Patented May 13, 1952

2,596,563

UNITED STATES PATENT OFFICE 2,596,563

PROCESS FOR PRODUCING 17-HYDROXY-20-KETO-21-ACYLOXY PREGNANES

Stephen Kaufmann, George Rosenkranz, and John Pataki, Mexico City, Mexico, assignors to Syntex S. A., Mexico City, Mexico, a corporation of Mexico No Drawing. Application October 30, 1950, Serial No. 193,022

7 Claims. (Cl. 260—397.4)

The present invention relates to a process for preparing cyclopentanophenanthrene derivatives.

More particularly the present invention relates to a process for the production of 17α-hydroxy-20-keto-21-acyloxy pregnane derivatives.

In the application of Stephen Kaufmann, George Rosenkranz and John Pataki, Serial No. 140,151, filed January 23, 1950, a process is described for the production of 17α-hydroxy-20-keto-21-acyloxy allopregnane derivatives.

As pointed out in the aforementioned application, the introduction of the 21-acetoxy group into the 17-hydroxy allopregnane compounds was a difficult problem. As further pointed out in the prior application, others had attempted unsuccessfully to convert the bromine atom into an acetoxy group in 21-bromo allopregnane-3β,17β-diol-20-one 3,17-diacetate by reacting this compound with alkali or silver acetate. In accordance with our co-pending application, however, the surprising discovery was made that the conversion of the 21-halogen atom into an acetoxy group takes place very smoothly when the 17-hydroxy group is in the α position.

In accordance with the present invention it has been discovered that the 21-halogen atom of a 17α-hydroxy compound of the character described can be converted into an acetoxy group in the normal pregnane series as well as in the allo series described in our prior application. The compounds which may be thus converted into the corresponding 21-acetoxy compounds may be indicated by the following general formula:

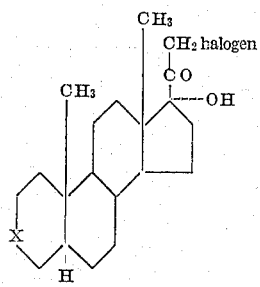

In the foregoing formula X is selected from the group consisting of

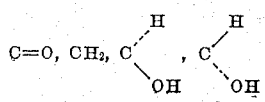

or a radical easily convertible to

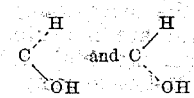

as by hydrolysis. The present invention is also applicable to pregnane derivatives, which, in addition to the variance set forth in the above formula, may also have a conventional group in ring C of the cyclopentanophenanthrene nucleus as for example, a C=O or a C—OH group in position 11 or 12. The above compounds, which may be characterized as 17α-hydroxy-20-keto-21-halogen pregnane derivatives, can be converted into the corresponding 21-acylates by reacting the corresponding 21-bromo compound with an excess of an alkali metal salt of a lower fatty acid. Preferably the compounds are first dissolved in a suitable organic solvent for the compound, as for example, a lower ketone solvent, i. e. acetone. The reaction preferably takes place upon heating or refluxing the bromo compound with the alkali metal lower fatty acid salt. Typical alkali metal lower fatty acid salts for the reaction are potassium or sodium acetate potassium or sodium propionate, etc. The pregnane compounds, which are thus reacted, may be otherwise substituted or unsubstituted in the ring system, for example, substituents in the ring system may consist of hydroxyl, alkoxyl, acyloxyl or keto groups, or the corresponding thio derivatives and other ether groups. The 21-halogen derivatives, which are the starting materials for the present invention, may be readily produced by brominating the corresponding pregnane compound in a conventional manner. Thereafter the corresponding iodo derivative, for example, may be prepared by reacting the 21-bromo compound with an alkali metal iodide, such as sodium iodide.

The following specific examples serve to illustrate the present invention but are not intended to limit the same.

Example I

To a solution of 14.8 g. of 21-bromo-pregnan-3β, 17α-diol-20-one in 200 cc. of acetone 10 g. of sodium iodide in 100 cc. of acetone were added. After refluxing for ten minutes the precipitated sodium bromide was filtered off, the filtrate containing the 21-iodo derivative was diluted to 500 cc. with acetone and refluxed with 75 g. of potassium acetate for twelve hours. The solution was concentrated to about 100 cc. and poured into 500 cc. water. The precipitate was filtered, washed with water, dried and crystallized from acetone-ether. Yield 11.5 g. of pregnane-3β,17α,21-triol-20-one 21-acetate. Melting point: 217–219° C.

*Example II*

To a solution of 16.3 g. of 21-bromo-pregnan-3α,17α-diol-11,20-dione (melting point 170° C. under decomposition) in 400 cc. of acetone, 10 g. of sodium iodide in 100 cc. of acetone were added. After refluxing for ten minutes the solution was filtered and the filtrate containing the 21-iodo derivative refluxed with 80 g. of potassium acetate for twelve hours. The solution was concentrated to about 200 cc., diluted with 800 cc. of water and extracted with ethyl acetate, the extract washed with water, dried and evaporated. The residue was crystallized from acetone-ether. 12.7 g. of the pregnan-3α,17α,21-triol-11,20-dione 21-monoacetate (melting point 217–221° C.) were obtained.

Although in the above examples the 21-halogen actually reacted are indicated as the 21-iodo compounds which are obtained by reaction of the corresponding 21-bromo compounds with sodium iodide, it is to be understood that the 21-bromo compounds may be reacted under precisely similar conditions to prepare the 21-acetate or acyloxy derivatives as set forth specifically in our copending application Serial No. 140,151.

We claim:

1. A method for producing 17-hydroxy-20-keto-21-acyloxy pregnane compounds, which comprises reacting 21-halogen-17α-hydroxyl-20-keto pregnane compounds with an alkali metal salt of a lower fatty acid in an organic solvent for the 21-halogen-17α-hydroxy-20-keto pregnane compounds.

2. A method for producing pregnane-3β,17α,21-triol-20-one 21-acetate, comprising reacting 21-halogen-pregnane-3β,17α-diol-20-one with an alkali metal acetate in an organic solvent for said 21-halogen-pregnane-3β,17α-diol-20-one.

3. A method for producing pregnane-3β,17α,21-triol-20-one 21-acetate, comprising reacting 21-bromo-pregnane-3β,17α-diol-20-one with an alkali metal acetate in an organic solvent for said 21-bromo-pregnane-3β,17α-diol-20-one.

4. A method for producing pregnane-3β,17α,21-triol-20-one 21-acetate, comprising reacting 21-iodo-pregnane-3β,17α-diol-20-one with an alkali metal acetate in an organic solvent for said 21-iodo-pregnane-3β,17α-diol-20-one.

5. A method for producing pregnane-3α,17α,21-triol-11,20-dione 21-monoacetate comprising reacting 21-halogen-pregnane-3α,17α-diol-11,20-dione with an alkali metal acetate in an organic solvent for said 21-halogen-pregnane-3α,17α-diol-11,20-dione.

6. A method for producing pregnane-3α,17α,21-triol-11,20-dione 21-monoacetate comprising reacting 21-bromo-pregnane-3α,17α-diol-11,20-dione with an alkali metal acetate in an organic solvent for said 21-bromo-pregnane-3α,17α-diol-11,20-dione.

7. A method for producing pregnane-3α,17α,21-triol-11,20-dione 21-monoacetate comprising reacting 21-iodo-pregnane-3α,17α-diol-11,20-dione with an alkali metal acetate in an organic solvent for said 21-iodo-pregnane-3α,17α-diol-11,20-dione.

STEPHEN KAUFMANN.
GEORGE ROSENKRANZ.
JOHN PATAKI.

No references cited.